United States Patent
Haack et al.

(10) Patent No.: US 11,428,247 B2
(45) Date of Patent: Aug. 30, 2022

(54) ELECTRO-HYDRAULIC SERVOVALVE CONTROL WITH INPUT

(71) Applicant: Woodward, Inc., Fort Collins, CO (US)

(72) Inventors: Bryan R. Haack, Fort Collins, CO (US); Sharwari Kulkarni, Elk Grove Village, IL (US)

(73) Assignee: Woodward, Inc., Fort Collins, CO (US)

( * ) Notice: Subject to any disclaimer, the term of this patent is extended or adjusted under 35 U.S.C. 154(b) by 224 days.

(21) Appl. No.: 16/784,864

(22) Filed: Feb. 7, 2020

(65) Prior Publication Data
US 2021/0246915 A1 Aug. 12, 2021

(51) Int. Cl.
F15B 9/09 (2006.01)
F15B 9/00 (2006.01)
G05B 19/46 (2006.01)

(52) U.S. Cl.
CPC .......... *F15B 9/09* (2013.01); *F15B 9/00* (2013.01); *G05B 19/46* (2013.01); *F15B 2211/634* (2013.01); *F15B 2211/6336* (2013.01); *F15B 2211/6656* (2013.01); *G05B 2219/37333* (2013.01)

(58) Field of Classification Search
CPC ............ F15B 9/09; F15B 2211/634; F15B 2211/6656
See application file for complete search history.

(56) References Cited

U.S. PATENT DOCUMENTS

| 4,999,552 | A | 3/1991 | Seipelt |
| 5,025,199 | A | 6/1991 | Ako |
| 5,504,409 | A | 4/1996 | Elrod, Jr. |
| 5,673,615 | A * | 10/1997 | Kawakami ............. B30B 15/22 100/35 |
| 5,806,805 | A | 9/1998 | Ralph et al. |
| 6,360,646 | B1 | 3/2002 | Tellander et al. |
| 6,655,404 | B2 * | 12/2003 | Hilaire ................ F15B 9/09 137/487.5 |

(Continued)

FOREIGN PATENT DOCUMENTS

| EP | 0093348 | 4/1983 |
| EP | 3081480 | 4/2016 |

OTHER PUBLICATIONS

Moog.com [online], "Electrohydraulic Valves A Technical Look", published on Oct. 8, 2013, retrieved on May 4, 2021, retrieved from URL<https://www.moog.com/literature/ICD/Valves-Introduction.pdf>.

(Continued)

*Primary Examiner* — Thomas E Lazo
(74) *Attorney, Agent, or Firm* — Fish & Richardson P.C.

(57) ABSTRACT

The subject matter of this specification can be embodied in, among other things, a controller apparatus that includes a digital controller configured to provide a digital position signal based on a setpoint and a differential analog feedback signal, and a converter circuit configured to provide a differential analog electrohydraulic servo valve position control signal based on the digital position signal, and provide the differential analog feedback signal based on the differential analog electrohydraulic servo valve position control signal.

20 Claims, 4 Drawing Sheets

(56) References Cited

U.S. PATENT DOCUMENTS

| | | | |
|---|---|---|---|
| 7,518,523 B2 * | 4/2009 | Yuan | F15B 9/09 |
| | | | 340/611 |
| 9,273,613 B2 | 3/2016 | Aurousseau et al. | |
| 9,709,979 B2 | 7/2017 | Guillory et al. | |
| 10,023,303 B2 | 7/2018 | Moutaux et al. | |
| 10,114,386 B2 * | 10/2018 | Summers | B64C 13/503 |
| 2004/0221896 A1 | 11/2004 | Ballenger et al. | |
| 2008/0294311 A1 | 11/2008 | Hensen | |
| 2017/0152022 A1 | 6/2017 | Moutax et al. | |
| 2017/0283040 A1 | 10/2017 | Judey | |

OTHER PUBLICATIONS

Moogvalves.com [online], "What Moves Your World Electro-Hydraulic Valves—A Technical Look 2 Moog Valve Types Explained", published on Apr. 5, 2017, retrieved on May 4, 2021, retrieved from URL<https://www.moogvalves.com/Global/FileLib/EH/Moog-SevoValves-Techn Look-Overview-en.pdf>.

PCT International Search Report and Written Opinion in International Appln. No. PCT/US2021/016468, dated May 17, 2021, 17 pages.

Qiao, "A Study of the Electro-Hydraulic Servo Valve Controller Based on C8051F060 SOC", Oxide Materials for Electronic Engineering (OMEE), Sep. 3, 2021, pp. 471-473.

* cited by examiner

ELECTRO-HYDRAULIC SERVOVALVE CONTROL WITH INPUT

TECHNICAL FIELD

This specification relates to control systems for electro-hydraulic servo valves.

BACKGROUND

Electro-hydraulic servo valves (EHSV) are used for electro-hydraulic control of components such as fuel valves, actuators, or switching valves. In some applications, EHSVs can be configured to provide hydraulic power to translate the position of linear or rotary actuators. With position feedback, the EHSV can be configured to drive the position of an actuator.

Aircraft vehicles include hydraulic servo control systems that control one or more adjustable surface components such as, for example, the ailerons, rudders, and elevators. Conventional hydraulic servo control systems are based on an analog electronic topology comprising various analog electronic devices to measure one or more analog signals that indicate a current position of the surface components. The analog signal is then compared to an analog set point value. The error between the analog signal and the analog set point value is determined, and the surface components are actively adjusted to maintain a minimum error.

SUMMARY

In general, this document describes control systems for electro-hydraulic servo valves.

In a first aspect, a controller apparatus includes a digital controller configured to provide a digital position signal based on a setpoint and a differential analog feedback signal, and a converter circuit configured to provide a differential analog electrohydraulic servo valve position control signal based on the digital position signal, and provide the differential analog feedback signal based on the differential analog electrohydraulic servo valve position control signal.

Various embodiments can include some, all, or none of the following features. The digital controller can be further configured receive an electrohydraulic servo valve spool position signal, and the digital position signal can be further based on the electrohydraulic servo valve spool position signal. The electrohydraulic servo valve spool position signal can be based on a linear position of a spool of an electrohydraulic servo valve. The electrohydraulic servo valve spool position signal can be a linear variable differential transformer signal. The digital controller can be further configured receive an output position signal, and the digital position signal can be further based on the output position signal. The output position signal can be based on a position of an actuator. The actuator can be a hydraulic rotary piston actuator. The output position signal can be a variable differential transformer signal.

In another aspect, a method of position control includes receiving a predetermined setpoint, receiving a differential analog feedback signal, determining a digital position signal based on the received predetermined setpoint and the received differential analog feedback signal, providing the determined digital position signal, determining a differential analog electrohydraulic servo valve position control signal based on the digital position signal, and providing the differential analog electrohydraulic servo valve position control signal.

Various implementations can include some, all, or none of the following features. The method can also include receiving an electrohydraulic servo valve spool position signal, where the digital position signal is further based on the electrohydraulic servo valve spool position signal. The electrohydraulic servo valve spool position signal can be based on a linear position of a spool of an electrohydraulic servo valve. The electrohydraulic servo valve spool position signal can be a linear variable differential transformer signal. The method can also include receiving an output position signal, wherein the digital position signal is further based on the output position signal. The output position signal can be based on a position of an actuator. The actuator can be a hydraulic rotary piston actuator. The output position signal can be a variable differential transformer signal.

In another aspect, a control system includes a controller configured to provide a predetermined setpoint and receive a first differential analog feedback signal, an electrohydraulic servo valve configured to receive a differential analog electrohydraulic servo valve position control signal, and a conversion apparatus comprising circuitry configured to perform operations including receiving the predetermined setpoint, receiving a second differential analog feedback signal, determining a digital position signal based on the received predetermined setpoint and the second differential analog feedback signal, determining the differential analog electrohydraulic servo valve position control signal based on the determined digital position signal, providing the differential analog feedback signal based on the differential analog electrohydraulic servo valve position control signal to the electrohydraulic servo valve, determining the first differential analog feedback signal based on the second differential analog feedback signal, and providing the first differential analog feedback signal to the controller.

Various embodiments can include some, all, or none of the following features. The control system can also include a position sensor configured to sense a position of a valve spool of the electrohydraulic servo valve and provide an electrohydraulic servo valve spool position signal representative of the position, wherein the controller is further configured receive the electrohydraulic servo valve spool position signal, and the digital position signal is further based on the electrohydraulic servo valve spool position signal. The control system can also include a hydraulic actuator configured to be actuated by a hydraulic output of the electrohydraulic servo valve, and a position sensor configured to sense a position of hydraulic actuator and provide an actuator position signal representative of the position, where the controller is further configured receive the actuator position signal, and the digital position signal is further based on the actuator position signal. The conversion apparatus can also include an amplifier configured to selectably amplify the differential analog electrohydraulic servo valve position control signal based on an amplification signal provided by the controller.

The systems and techniques described here may provide one or more of the following advantages. First, a system can provide position control in harsh operational environments. Second, the system can operate with greater immunity to, and reduced emission of, electromagnetic interference. Third, the system can operate with greater immunity to the effects of temperature changes. Fourth, the system can operate with lower power requirements and greater power efficiency.

The details of one or more implementations are set forth in the accompanying drawings and the description below.

Other features and advantages will be apparent from the description and drawings, and from the claims.

DETAILED DESCRIPTION

This document describes control systems for electro-hydraulic servo valves. The analog devices used in previous designs to generate and measure analog signals are susceptible to temperature changes. Consequently, in some implementations such as aircraft applications, these components are subjected to different temperatures during operation, and various characteristics of the analog devices (e.g., gain, error, and phase margin) can vary, thereby reducing the accuracy of such analog control systems. Some such previous designs have also required the use of multiple power sources to power the individual analog components and to define the analog set point values. Consequently, such previous analog control systems have required increased power, such that the overall power efficiency of the aircraft is reduced.

In general, the control systems described in this document implement closed loop control that remains in the digital domain, and uses position feedback systems that are resistant to the effects of temperature changes and other adverse operational conditions that can be experienced in some applications (e.g., aircraft control). The control systems described in this document also implement analog control signals instead of the pulse-width-modulated (PWM) control signals used in some previous designs. By using analog signals instead of PWM, the electromagnetic interference that can be caused by PWM signals can be avoided.

Figure 1:
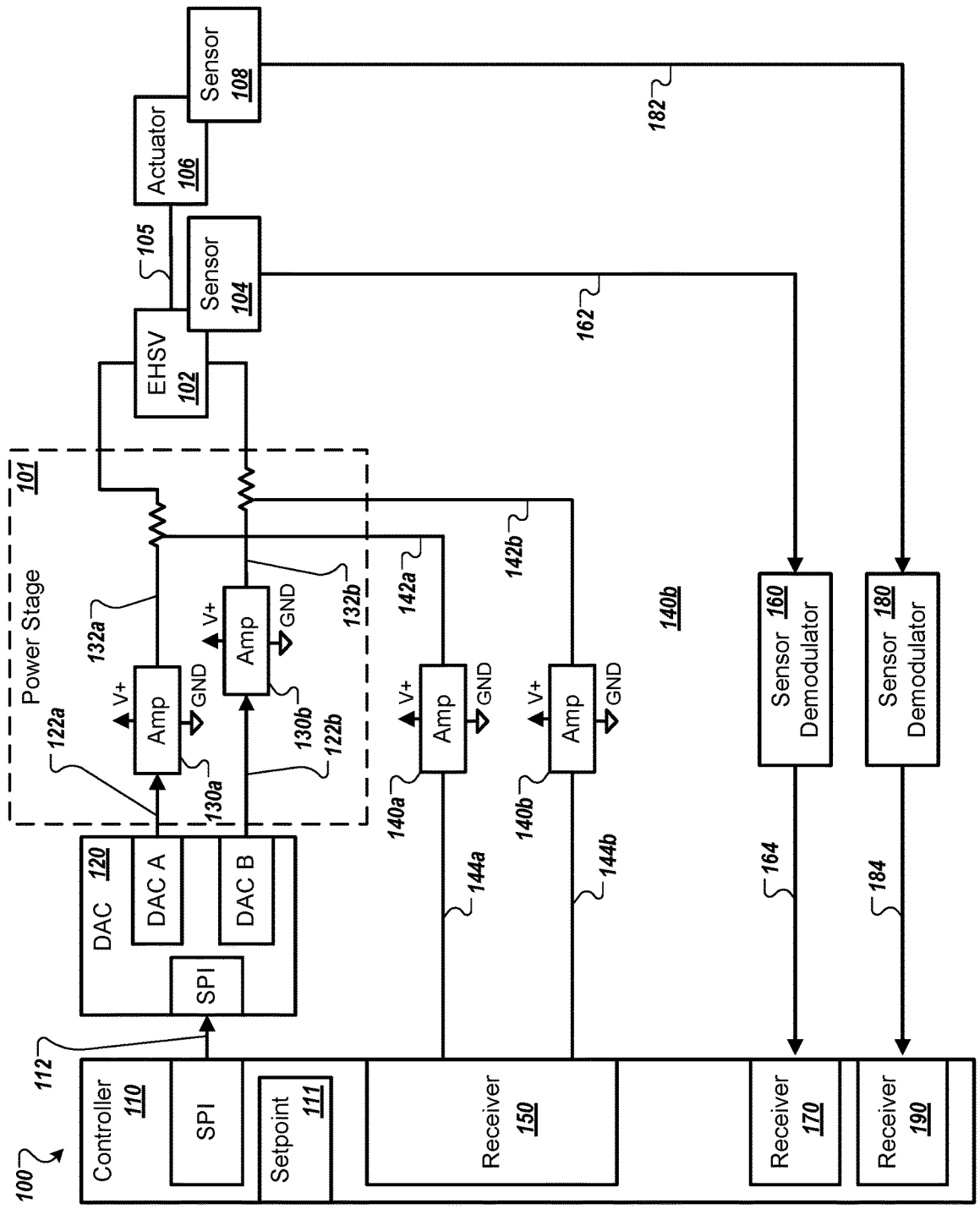
FIG. 1 is a schematic diagram that shows an example of a system for hydraulic position control.

FIG. 1 is a schematic diagram that shows an example of a system 100 for hydraulic position control. The system 100 includes an electro-hydraulic servo valve (EHSV) 102. The EHSV 102 is configured to move to multiple bi-polar positions that are sensed by a sensor 104. In some implementations, the sensor 104 can be a resolver. In some implementations, the sensor 104 can be a variable differential transformer (VDT), such as a rotary VDT or a linear VDT. For example, VDTs have very few or no internally contacting parts that could experience temperature-related problems, and as such VDTs can be used in operational environments that have wide operational temperature ranges that could damage, degrade, or destroy other types of position sensors (e.g., in proximity to engines). VDTs are also mechanically robust, with few or no moving parts in frictional contact to wear out due to mechanical cycling and/or vibration.

The EHSV 102 controls flows of hydraulic fluid to an actuator 106 (e.g., a linear hydraulic piston, a hydraulic rotary piston actuator) through one or more hydraulic lines 105. The actuator 106 is configured to drive the position of a physical or mechanical load (e.g., an aircraft flight control surface, a valve). The position of the actuator 106 is sensed by a sensor 108. In some implementations, the sensor 108 can be a VDT or resolver.

A controller 110 (e.g., a digital controller, a processor, a field-programmable gate array) is configured to provide a digital control signal 112 to a digital-to-analog converter (DAC) 120. The digital control signal 112 represents a target (e.g., desired) configuration or position of the EHSV 102 and/or the actuator 106. The DAC 120 converts the digital control signal 112 into a differential analog control signal that includes an analog control signal 122a and an analog control signal 122b. In some embodiments, the digital control signal 112 can be transmitted and received as a serial peripheral interface (SPI) signal (e.g., the controller 110 and the DAC 120 can communicate with each other through SPI ports). The digital control signal 112 is based in part on a received (e.g., user or automatically provided) or determined (e.g., calibrated, calculated) setpoint 111, and on one or more feedback signals that will be described in subsequent paragraphs.

The system 100 includes a power stage 101 that includes an amplifier 130a and an amplifier 130b. The analog control signal 122a is amplified by the amplifier 130a to provide an amplified analog control signal 132a. The analog control signal 122b is amplified by the amplifier 130b to provide an amplified analog control signal 132b. The amplified analog control signals 132a and 132b form an amplified differential analog control signal that is provided to drive the configuration of the EHSV 102. In some embodiments, the analog output current needed to drive the motor of the EHSV can be about +/−10 mA. In some implementations, a DAC with an op-amp buffered output can provide a tight, digitally controlled analog output that is differential. The DAC approach is inherently less noisy (e.g., EMC) as compared to a PWM approach.

A portion 142a of the amplified analog control signal 132a is amplifier by an amplifier 140a to provide a buffered analog control signal 144a. A portion 142b of the amplified analog control signal 132b is amplifier by an amplifier 140b to provide an amplifiedanalog control signal 144a. The amplified analog control signals 144a and 144b form an amplified differential analog control signal that is provided to receiver 150. The receiver 150 is an analog-to-digital converter (ADC). The receiver 150 converts the amplified differential analog signal provided by the amplified analog control signals 144a and 144b into a digital signal that can be processed by the controller 110. In use, the amplified analog control signals 144a and 144b provide feedback that is used in a control loop that can be used for determining the digital control signal 112. In the illustrated example, the receiver 150 is integrated with the controller 110, but in some embodiments, the receiver 150 can be a separate module in communication with the controller 110.

The sensor 104 provides a position signal 162 to a signal demodulator 160, and the signal demodulator 160 provides a demodulated signal 164 based on the position signal 162. A receiver 170 is configured to receive the position signal 162. In some embodiments, the receiver can be configured to receive analog and/or digital signals and convert or otherwise provide them in a format that can be used by the controller 110. For example, the sensor 104 can be a VDT, and the position signal 162 can be an analog differential output signal of the VDT that varies with the position or configuration of the EHSV 102. In such an example, the signal demodulator 160 can be an ADC that is configured to convert the VDT signal to a digital signal that can be received by the receiver 170. In another example, the sensor 104 can be a resolver, and the position signal 162 can be a digital signal that varies with the position or configuration of the EHSV 102. In such an example, the signal demodulator 160 can be a protocol converter that is configured to convert the digital signal to a format that can be received by the receiver 170.

In use, the demodulated signal 164 provides feedback that is used in a control loop that can be used for determining the digital control signal 112. In the illustrated example, the receiver 170 is integrated with the controller 110, but in some embodiments, the receiver 170 can be a separate module in communication with the controller 110.

The sensor 108 provides a position signal 182 to a signal demodulator 180, and the signal demodulator 180 provides a demodulated signal 184 based on the position signal 182. A receiver 190 is configured to receive the position signal 182. In some embodiments, the receiver 190 can be configured to receive analog and/or digital signals and convert or otherwise provide them in a format that can be used by the controller 110. For example, the sensor 108 can be a VDT, and the position signal 182 can be an analog differential output signal of the VDT that varies with the position or configuration of the EHSV 102. In such an example, the signal demodulator 180 can be an ADC that is configured to convert the VDT signal to a digital signal that can be received by the receiver 190. In another example, the sensor 108 can be a resolver, and the position signal 182 can be a digital signal that varies with the position or configuration of the EHSV 102. In such an example, the signal demodulator 180 can be a protocol converter that is configured to convert the digital signal to a format that can be received by the receiver 190.

In use, the demodulated signal 184 provides feedback that is used in a control loop that can be used for determining the digital control signal 112. In the illustrated example, the receiver 190 is integrated with the controller 110, but in some embodiments, the receiver 190 can be a separate module in communication with the controller 110. In some embodiments, the controller 110 can be an FPGA or a microprocessor. For example, both FPGAs and microprocessors can be well suited to read the feedback from the sensors 104 and/or 108 (e.g., VDT or resolver signals) and drive a digital control signal. The controller 110 closes the current control loop and the position control loop, allowing for configurability in ranges, Ki/Kp values, and software imposed limits.

An advantage of this approach is that the closed loop control can remain in the digital domain. Current control in the digital domain allows for configurability, for example, if a different motor is connected. The power stage can remain analog, and the absence of PWM switching provides the advantage of the inherently low radiated emissions. The DAC 120 with differential analog outputs allows for precise control in the low current domain. The differential voltages of the amplified analog control signals 144a and 144b allow for analog-to-digital conversion within the receiver 150 to be sampled at substantially any time, with substantially no timing constraints to sense the current.

The system 100 can be used in harsh operational environments (e.g., environments that would degrade, destroy, or otherwise negatively affect the longevity and/or performance of previous control systems). In some implementations, the controller 110 can be located remotely from other components of the system 100. For example, the controller 110 can be located in or near an aircraft cockpit, and the actuator 106 can be in an aircraft wing or engine. In such an example, the digital nature of the digital control signal 112 can allow the digital control signal 112 to be transmitted from near the cockpit to near the actuator 106 with relatively greater immunity to noise and/or signal degradation that could negatively affect an analog control signal. In another example, and as described in previous paragraphs, the sensors 104 and/or 106 can be ratio metric VDTs or resolvers, which are robust absolute position sensors that are inherently frictionless, have virtually infinite cycle life, and can operate in harsh environments.

In some implementations, the EHSV 102 can be located remotely from the DAC 120. For example, since the analog control signals 122a and 122b, and the amplified analog control signals 132a and 132b are differential analog signals, they are substantially immune to electrical noise over a distance (e.g., unlike non-differential signals). In another example, since the analog control signals 122a and 122b, and the amplified analog control signals 132a and 132b are differential analog signals, these signals can emit substantially less electromagnetic interference over long interconnections than the PWM signals used in other designs.

In some implementations, the actuator 106 can be located remotely from the EHSV 102. For example, the fluidic connection provided by the hydraulic lines 105 between the EHSV 102 and the actuator 106 is immune to electrical noise, and can be tolerant of high temperatures that might otherwise damage electrical connections (e.g., melt insulation on wires).

In some implementations, the sensor 104 can be located remotely from the controller 110 and/or the signal demodulator 160. For example, the sensor 104 can be a VDT and the position signal 162 can be a VDT signal. Some types of VDT signals are differential analog signals that vary as the sensed position changes. Differential signals are highly immune to the effects of electrical noise and signal degradation that may otherwise occur over long transmission distances. In some implementations, the sensor 108 can be located remotely from the controller 110 and/or the signal demodulator 180 for similar reasons.

In some embodiments, the power stage 101 can be replaced or modified based on the particular application and/or user needs. For example, power to the amplifiers 130a and 130b can be controlled based on the current demand. In such an example, if the current is low the rail can be dropped, and if high current is needed, then the rail can be increased. In another example, more output drive current can be achieved by connecting two amplifiers in parallel with a higher supply voltage to the amplifier. In such examples, the second op-amp could be changed to a difference voltage follower. A follower configuration can allow a single DAC output to drive the differential current, reducing the complexity of the digital control. In another example, the amplifier configuration can also be replaced by an H-bridge topology for higher power currents.

Figure 2:
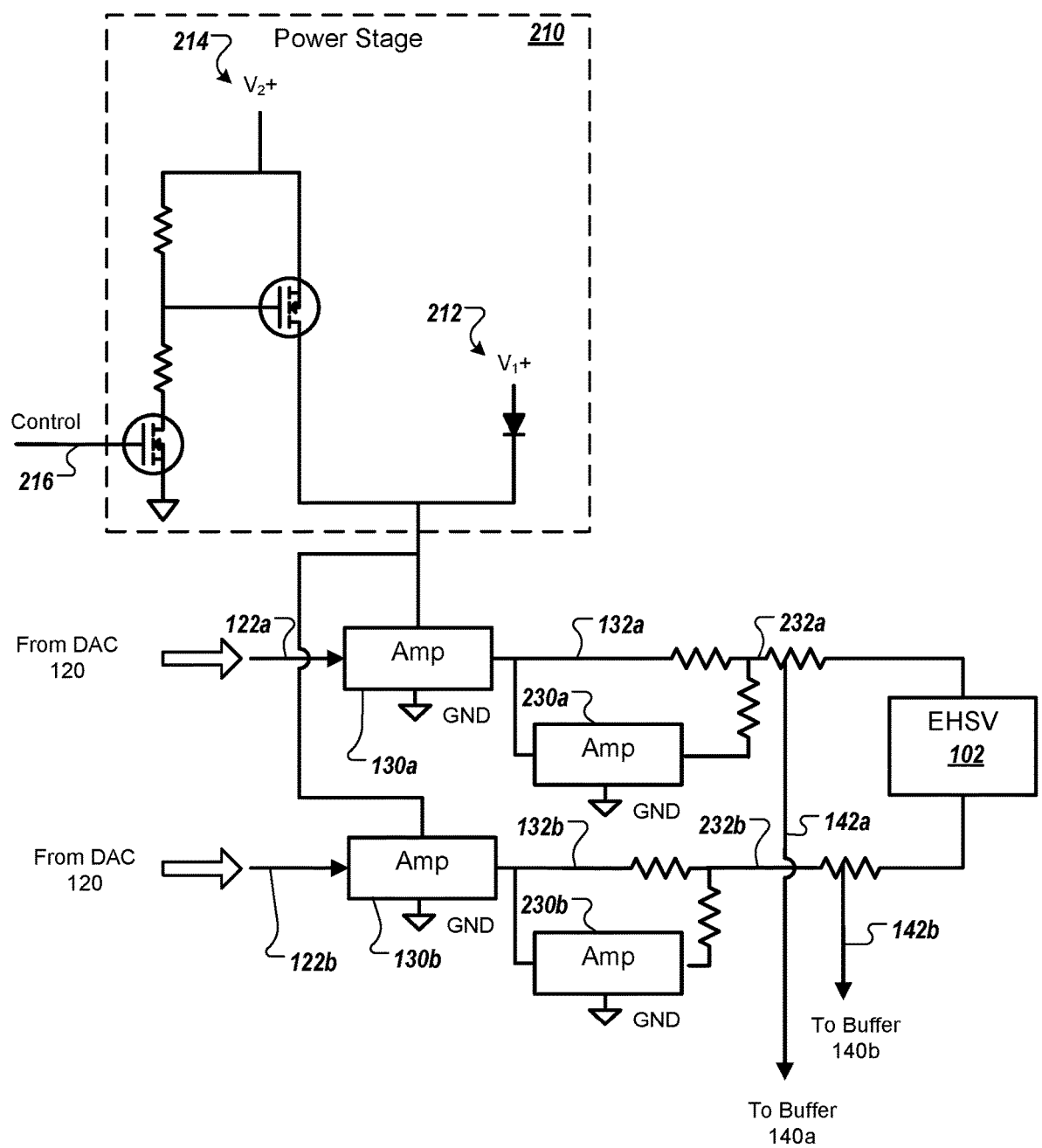
FIG. 2 is a block diagram that shows an example variant of a power stage of the system of FIG. 1.

FIG. 2 is a block diagram that shows an example power stage 200. In some embodiments, the power stage 200 can be a variant of the example power stage 101 of the system 100 of FIG. 1. In general, the power stage 200 is configured such that power to the amplifiers 130a and 130b can be controlled, and includes parallel amplifiers to drive the amplified analog control signals 132a and 132b.

The power stage 200 includes the amplifiers 130a and 130b, and the EHSV 102 in the illustrated view. The analog control signal 122a and the analog control signal 122b are received from the DAC 120 (not shown in this view), and the portions 142a and 142b are provided to the amplifiers 140a and 140b (not shown in this view).

Power to the amplifiers 130a and 130b is controlled by a power control circuit 210. Constant power is supplied to the amplifiers 130a and 130b by a power supply 212. Additional power from a power supply 214 is supplied to the amplifiers 130a and 130b based on an amplification control signal 216 (e.g., provided by the controller 110). When the signal 216 is brought high, a switch 218a and a switch 218b allow the additional power from the power supply 214 to flow to the amplifiers 130a and 130b. When the signal 216 is brought low, the switch 218a and the switch 218b prevent additional power from the power supply 214 to flow to the amplifiers 130a and 130b.

Output drive current, in addition to the current provided by the amplifier 130a, is provided to the EHSV 102 by an amplifier 230a. The amplifier 230a is configured to follow the amplified analog control signal 132a output by the amplifier 130a, and provide its output in parallel with the amplified analog control signals 132a to form an amplified analog control signal 232a that is provided to the EHSV 102. Similarly, the amplifier 230b is configured to follow the amplified analog control signal 132b output by the amplifier 130b, and provide its output in parallel with the amplified analog control signals 132b to form an amplified analog control signal 232b that is provided to the EHSV 102. Together the amplified analog control signals 232a and 232b form a differential analog control signal that drives the operation of the EHSV 102.

Figure 3:
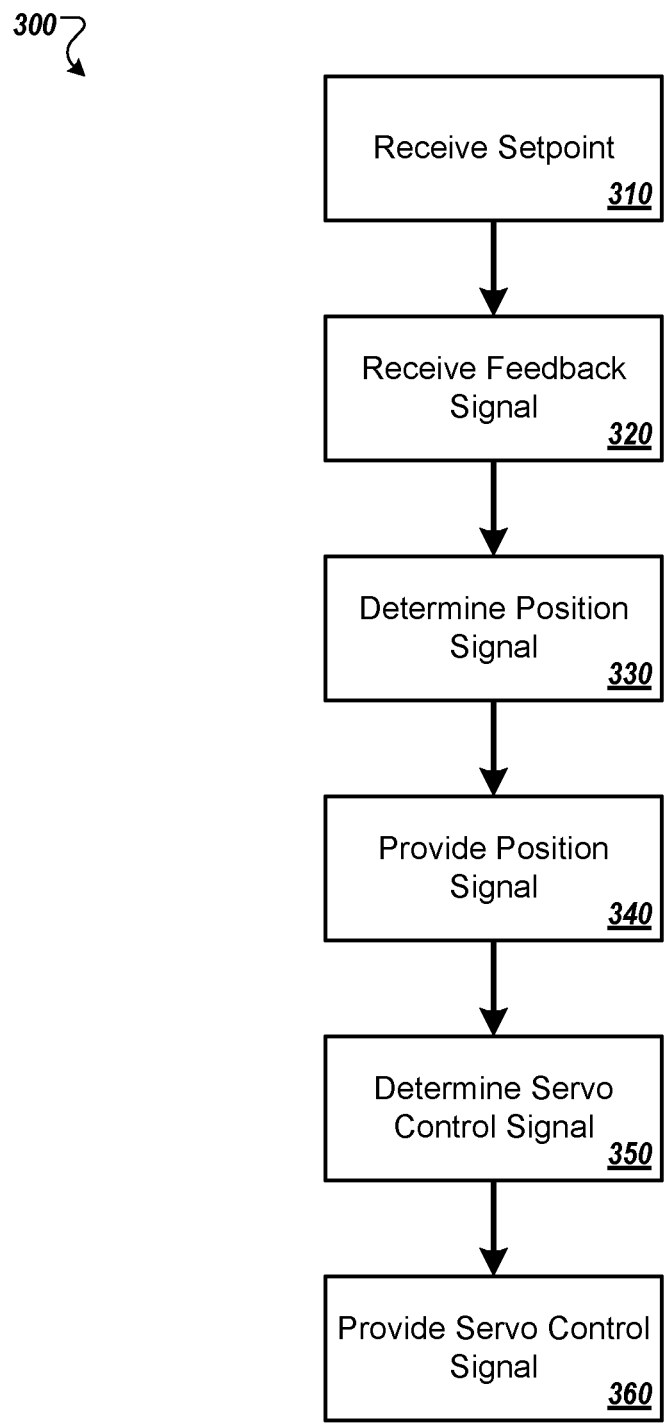
FIG. 3 is flow chart that shows an example of a process for hydraulic position control.

FIG. 3 is a flow chart that shows an example of a process 300 for hydraulic position control. The process may be performed, for example, by a system such as the example system 100 of FIG. 1. For clarity of presentation, the description that follows uses the system 100 and the power stage 200 as examples for describing the process. However, another system, or combination of systems, may be used to perform the processes.

At 310, a predetermined setpoint is received. For example, the example controller 110 can receive the setpoint 111 from a human operator (e.g., a pilot) or from another circuit (e.g., an autopilot) that represents a desired configuration of the EHSV 102, the actuator 106, or mechanical loads that are actuated by the actuator 106.

At 320, a differential analog feedback signal is received. For example, controller 110 can receive the amplified differential analog signal provided by the amplified analog control signals 144a and 144b.

At 330, a digital position signal is determined based on the received setpoint and the received differential analog feedback signal. For example, the controller 110 can determine the digital control signal 112 based on the setpoint 111 and the amplified analog control signals 144a and 144b.

At 340, the determined digital position signal is provided. For example, the digital control signal 112 can be provided from the controller 110 to the DAC 120.

At 350, a differential analog electrohydraulic servo valve position control signal is determined based on the digital position signal. For example, the DAC 120 provides the amplified analog control signals 132a and 132b, which together form the amplified differential analog control signal.

At 360, the differential analog electrohydraulic servo valve position control signal is provided. For example, the amplified differential analog control signal formed by the amplified analog control signals 132a and 132b is provided by the DAC 120.

In some implementations, the process 300 can also include receiving an electrohydraulic servo valve spool position signal, where the digital position signal is further based on the electrohydraulic servo valve spool position signal. For example, the controller 110 can receive the demodulated signal 164 based on the position signal 162, and the controller 110 can determine the digital control signal 112 based on the demodulated signal 164.

In some implementations, the electrohydraulic servo valve spool position signal can be based on a linear position of a spool of an electrohydraulic servo valve. For example, the position signal 162 can be provided by the sensor 104, which is configured to sense the linear position of the EHSV 102. In some implementations, the electrohydraulic servo valve spool position signal can be a variable differential transformer signal. For example, the sensor 104 can be a linear or rotary VDT.

In some implementations, the process 300 can also include receiving an output position signal, wherein the digital position signal is further based on the output position signal. For example, the controller 110 can receive the demodulated signal 184 based on the position signal 182, and the controller can determine the digital control signal 112 based on the demodulated signal 184. In some implementations, the output position signal can be a variable differential transformer signal. For example, the sensor 108 can be a linear or rotary VDT that can provide the position signal 182 as a VDT signal.

In some implementations, the output position signal can be based on a position of an actuator. For example, the position signal 182 is provided by the sensor 108, which is configured to sense the position of the actuator 106 or a load that is positioned or otherwise controlled by the actuator 106. In some implementations, the actuator can be a hydraulic rotary piston actuator (RPA). For example, the actuator 106 can be a hydraulic RPA.

Figure 4:
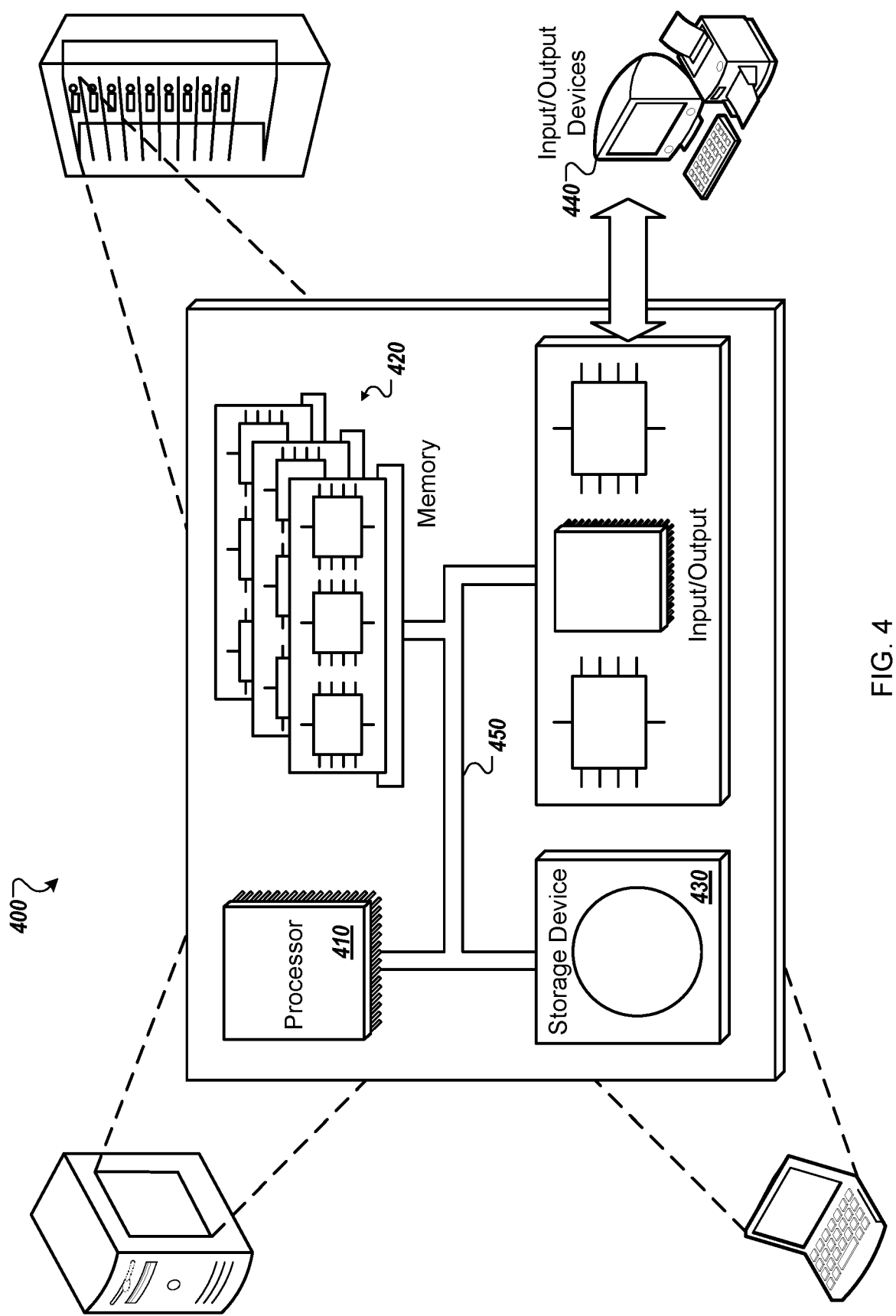
FIG. 4 is a schematic diagram of an example of a generic computer system.

FIG. 4 is a schematic diagram of an example of a generic computer system 400. The system 400 can be used for the operations described in association with the process 300 according to one implementation. For example, the system 400 may be included as part or all of the example controller 110 of FIG. 1.

The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits) and/or field programmable gate arrays (FPGA).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. User interaction can be command line-based, or by using register reads and writes to get the information in and/or out of the system.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A controller apparatus, comprising:
   a digital controller configured to provide a digital position signal based on a setpoint and a differential analog feedback signal; and
   a converter circuit configured to provide a differential analog electrohydraulic servo valve position control signal to an electrohydraulic servo valve based on the digital position signal, and provide a portion of the differential analog electrohydraulic servo valve position control signal as the differential analog feedback signal.

2. The controller apparatus of claim 1, wherein the digital controller is further configured receive an electrohydraulic servo valve spool position signal, and the digital position signal is further based on the electrohydraulic servo valve spool position signal.

3. The controller apparatus of claim 2, wherein the electrohydraulic servo valve spool position signal is based on a linear position of a spool of an electrohydraulic servo valve.

4. The controller apparatus of claim 2, wherein the electrohydraulic servo valve spool position signal is a linear variable differential transformer signal.

5. The controller apparatus of claim 1, wherein the digital controller is further configured receive an output position signal, and the digital position signal is further based on the output position signal.

6. The controller apparatus of claim 5, wherein the output position signal is based on a position of an actuator.

7. The controller apparatus of claim 6, wherein the actuator is a hydraulic rotary piston actuator.

8. The controller apparatus of claim 5, wherein the output position signal is a variable differential transformer signal.

9. A method of position control comprising:
   receiving a predetermined setpoint;
   receiving a differential analog feedback signal;
   determining a digital position signal based on the received predetermined setpoint and the received differential analog feedback signal;
   providing the determined digital position signal;
   determining a differential analog electrohydraulic servo valve position control signal based on the digital position signal; and
   providing a portion of the differential analog electrohydraulic servo valve position control signal as the differential analog feedback signal.

10. The method of claim 9, further comprising receiving an electrohydraulic servo valve spool position signal, wherein the digital position signal is further based on the electrohydraulic servo valve spool position signal.

11. The method of claim 10, wherein the electrohydraulic servo valve spool position signal is based on a linear position of a spool of an electrohydraulic servo valve.

12. The method of claim 10, wherein the electrohydraulic servo valve spool position signal is a linear variable differential transformer signal.

13. The method of claim 9, further comprising receiving an output position signal, wherein the digital position signal is further based on the output position signal.

14. The method of claim 13, wherein the output position signal is based on a position of an actuator.

15. The method of claim 14, wherein the actuator is a hydraulic rotary piston actuator.

16. The method of claim 14, wherein the output position signal is a variable differential transformer signal.

17. A control system comprising:
a conversion apparatus;
a controller configured to perform operations comprising:
    receiving a setpoint;
    receiving a first analog feedback signal from the conversion apparatus;
receiving a second analog feedback signal from the conversion apparatus;
    determining a differential analog feedback signal based on the received first analog feedback signal and the received second analog feedback signal; and
    providing a digital position control signal based on the received setpoint, and the determined differential analog feedback signal;
an electrohydraulic servo valve configured to receive a differential analog electrohydraulic servo valve position control signal, comprising a first analog control signal and a second analog control signal, from the conversion apparatus; and
the conversion apparatus comprising circuitry configured to perform operations comprising:
    receiving the digital position control signal;
    determining the first analog control signal based on the provided digital position control signal;
    determining the second analog control signal based on the provided digital control signal;
    providing the determined first analog control signal and the determined second analog control signal to the electrohydraulic servo valve;
    providing the first analog feedback signal to the controller based on the determined first analog control signal; and
    providing the second analog feedback signal to the controller based on the determined second analog control signal.

18. The control system of claim 17, further comprising a position sensor configured to sense a position of a valve spool of the electrohydraulic servo valve and provide an electrohydraulic servo valve spool position signal representative of the position, wherein the controller is further configured receive the electrohydraulic servo valve spool position signal, and the digital position control signal is further based on the electrohydraulic servo valve spool position signal.

19. The control system of claim 17, further comprising a hydraulic actuator configured to be actuated by a hydraulic output of the electrohydraulic servo valve, and a position sensor configured to sense a position of hydraulic actuator and provide an actuator position signal representative of the position, wherein the controller is further configured receive the actuator position signal, and the digital position control signal is further based on the actuator position signal.

20. The control system of claim 17, wherein the conversion apparatus further comprises an amplifier configured to amplify the differential analog electrohydraulic servo valve position control signal at a selectable amplification based on an amplification signal provided by the controller.

\* \* \* \* \*